(12) United States Patent
Abe et al.

(10) Patent No.: US 10,379,434 B2
(45) Date of Patent: Aug. 13, 2019

(54) PORTABLE SCREEN DEVICE

(71) Applicant: IZUMI-COSMO COMPANY, LIMITED, Osaka (JP)

(72) Inventors: Teruyuki Abe, Tokyo (JP); Kazuharu Seki, Tokyo (JP)

(73) Assignee: IZUMI-COSMO COMPANY, LIMITED, Osaka (JP)

( * ) Notice: Subject to any disclaimer, the term of this patent is extended or adjusted under 35 U.S.C. 154(b) by 0 days.

(21) Appl. No.: 16/068,534

(22) PCT Filed: Jan. 5, 2017

(86) PCT No.: PCT/JP2017/000068
§ 371 (c)(1),
(2) Date: Jul. 6, 2018

(87) PCT Pub. No.: WO2017/119420
PCT Pub. Date: Jul. 13, 2017

(65) Prior Publication Data
US 2019/0025691 A1   Jan. 24, 2019

(30) Foreign Application Priority Data

Jan. 8, 2016   (JP) .................................. 2016-002776

(51) Int. Cl.
*G03B 21/58* (2014.01)
*G03B 21/60* (2014.01)
(Continued)

(52) U.S. Cl.
CPC ............ *G03B 21/58* (2013.01); *G03B 21/56* (2013.01); *G03B 21/60* (2013.01); *G06F 1/1601* (2013.01); *H04M 1/0268* (2013.01)

(58) Field of Classification Search
CPC ..................................................... G03B 21/58
(Continued)

(56) References Cited

U.S. PATENT DOCUMENTS 3,592,255 A  *  7/1971  Potter .................... G03B 21/58
                                                        160/24
6,378,594 B1 *  4/2002  Yamanaka ................ E06B 9/80
                                                        160/238
(Continued)

FOREIGN PATENT DOCUMENTS

JP         59138690 A     8/1984
JP          6059293 A     4/1985
(Continued)

OTHER PUBLICATIONS

International Search Report for corresponding International Application No. PCT/JP2017/000068, dated Apr. 4, 2017.
(Continued)

*Primary Examiner* — Clayton E. LaBalle
*Assistant Examiner* — Kevin C Butler
(74) *Attorney, Agent, or Firm* — Renner, Otto, Boisselle & Sklar, LLP

(57) ABSTRACT

In order to provide a screen device capable of eliminating a slack arising in a screen pulled out, there is provided a portable screen device, comprising a casing, a roll, a screen, and a screen support part, the casing having an opening, the roll being rotatably placed in the casing, the screen being configured to be wound on the roll during a storage of the screen and to be pulled out in an upward direction from the opening of the casing upon an use of the screen, the screen support part being for supporting the screen in an extension state by a pull out of the screen, wherein a dial mechanism is provided on a side portion of the casing, and wherein the dial mechanism is partially capable of pulling the screen in the extension state back in a different direction from a pull out direction of the screen.

11 Claims, 17 Drawing Sheets

(51) Int. Cl.
*G03B 21/56* (2006.01)
*H04M 1/02* (2006.01)
*G06F 1/16* (2006.01)

(58) Field of Classification Search
USPC .......................................................... 359/461
See application file for complete search history.

(56) References Cited

U.S. PATENT DOCUMENTS

| | | | | |
|---|---|---|---|---|
| 7,426,077 | B2* | 9/2008 | Miyagawa | G03B 21/56 359/461 |
| 7,770,625 | B2* | 8/2010 | Lukos | E04F 10/0662 160/242 |
| 7,830,600 | B2* | 11/2010 | Jiang | G03B 21/56 160/310 |
| 8,804,239 | B2* | 8/2014 | Qingjun | G03B 21/58 359/461 |
| 9,027,625 | B2* | 5/2015 | Persson | E06B 9/42 160/23.1 |
| 9,152,032 | B2* | 10/2015 | Mullet | E06B 9/62 |
| 10,254,638 | B2* | 4/2019 | Prevel | G03B 21/58 |
| 2011/0032612 | A1 | 2/2011 | Abe et al. | |
| 2012/0162760 | A1* | 6/2012 | Chen | G03B 21/58 359/461 |

FOREIGN PATENT DOCUMENTS

| | | | |
|---|---|---|---|
| JP | 06235973 A | 8/1994 | |
| JP | H06235973 * | 8/1994 | ............. G03B 21/58 |
| JP | 2001-312004 A | 11/2001 | |
| JP | 2005-113538 A | 4/2005 | |
| JP | 2006-072291 A | 3/2006 | |
| JP | 2007-334160 A | 12/2007 | |
| WO | 2009/133808 A1 | 11/2009 | |

OTHER PUBLICATIONS

International Preliminary Report on Patentability for corresponding International Application No. PCT/JP2017/000068 dated Jul. 19, 2018.

* cited by examiner

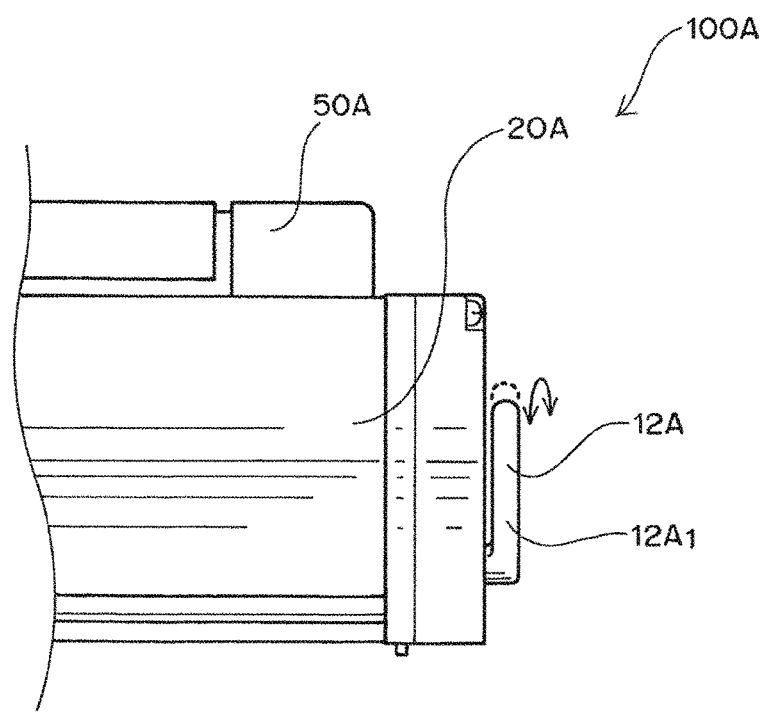

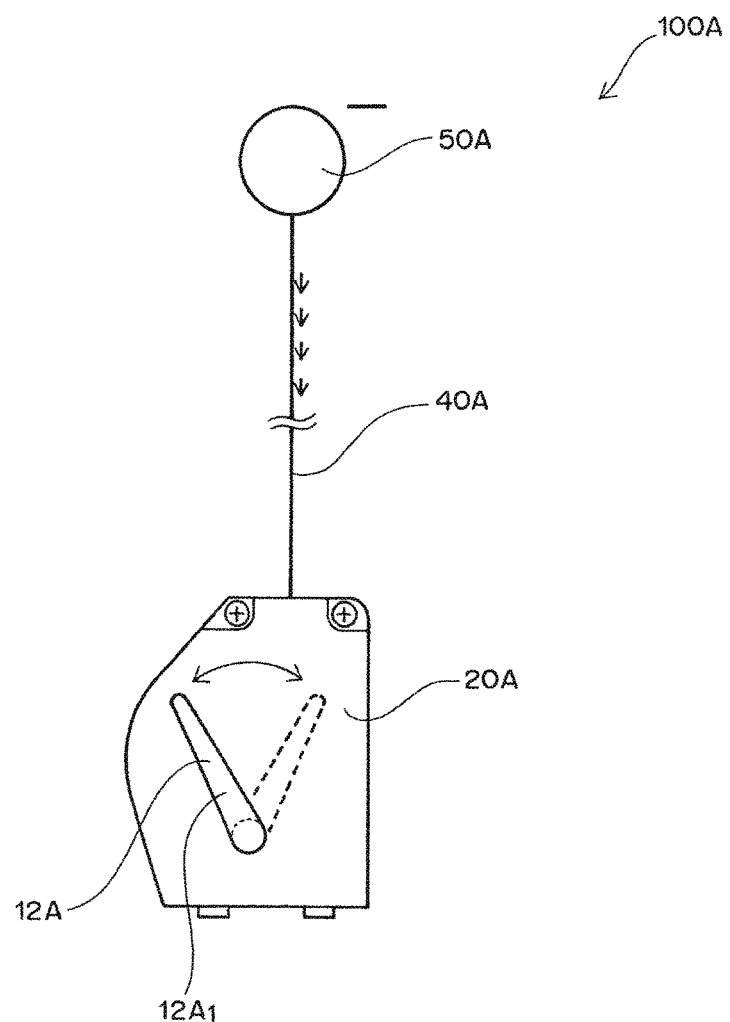

PORTABLE SCREEN DEVICE

TECHNICAL FIELD

The disclosure relates to a portable screen device.

BACKGROUND OF THE INVENTION

Recently, there is an increasing demand for a portable screen device which is easy to carry and can be installed at arbitrary location. The portable screen device mainly comprises a screen capable of a winding, a casing capable of storing the wound screen, and a support part capable of supporting a screen pulled out from the casing (see Patent Document 1). Recently, there is an increasing demand for projecting an image on a screen by using an "ultrashort focus projector", the ultrashort focus projector having advantages such as no shadow or the like which is projected on the screen because it can be installed at a close distance (e.g., less than 50 cm) from the screen device.

PATENT DOCUMENTS (RELATED ART PATENT DOCUMENTS)

PATENT DOCUMENT 1: Japanese Unexamined Patent Application Publication No. 2007-334160

DISCLOSURE OF THE INVENTION

Problems to be Solved by the Invention

When projecting an image on a screen device using an ultrashort focus projector, the following problems may occur.

As shown in FIG. 8, the ultrashort focus projector 41 can be installed at a close distance from the screen device 100'. However, it is necessary to install the ultrashort focus projector 41 in an obliquely downward direction of the installed position of the screen 40'. That is, it is necessary to project the image of the projector 41 onto the screen 40' from the obliquely downward direction of the installed position of the screen 40'. However, if a slack arises in the screen 40' pulled out, the image projected on the screen 40' may be distorted due to the image from the projector 41 which is projected obliquely downward. Therefore, it is impossible to accurately project the image on the screen 40'.

An object of the present invention is to provide a screen device capable of eliminating a slack arising in a screen pulled out.

Means for Solving the Problems

In order to achieve the above object, an embodiment of the present invention provides a portable screen device, comprising a casing, a roll, a screen, and a screen support part, the casing having an opening, the roll being rotatably placed in the casing, the screen being configured to be wound on the roll during a storage of the screen and to be pulled out in an upward direction from the opening of the casing upon an use of the screen, the screen support part being for supporting the screen in an extension state by a pull out of the screen, wherein a dial mechanism is provided on a side portion of the casing, and wherein the dial mechanism is partially capable of pulling the screen in the extension state back in a different direction from a pull out direction of the screen.

In a preferable embodiment, the dial mechanism is capable of providing the screen in the extension state with a tension.

In a preferable embodiment, the dial mechanism is capable of maintaining the tension applied to the screen in the extension state.

In a preferable embodiment, the dial mechanism at least comprises:

a shaft, the shaft being connected to an end portion of the roll;

a gear, the gear being connected to an end portion of a shaft;

a base plate, the base plate being positioned at a side portion of the casing and comprising a first through-hole through which the shaft passes;

a rotary part, the rotary part being located above the base plate and comprising knurls;

a first engagement part, the first engagement part being located on the base plate and being capable of engaging with the knurls of the rotary part; and a second engagement part, the second engagement part being located on the rotary part and being capable of engaging with the gear in order to let the gear pivot in the different direction from the pull out direction of the screen.

In a preferable embodiment, the first engagement part is sequentially capable of engaging with the knurls of the rotary part when the gear engaging with the second engagement part pivots in the different direction.

In a preferable embodiment, the base plate further comprises an elastic part, the elastic part serving to bring the second engagement part into an initial position before the second engagement part engages with the gear.

In a preferable embodiment, the rotary part comprises a protrusion for compressing an elastic part.

In a preferable embodiment, the base plate further comprises a projection, the projection being configured to project from the base plate to the rotary part comprising the second engagement part, and wherein the projection is capable of controlling a range for moving the second engagement part which engages with the gear pivoting in the different direction.

In a preferable embodiment, the base plate further comprises a second through-hole and a part to be pressed on an inner main surface of the base plate, the second through-hole being different from the first through-hole through which the shaft passes, wherein the first engagement part comprises a bend portion passing through the second through-hole of the base plate, and wherein the part to be pressed and the bend portion of the first engagement part are in a connection with each other.

In a preferable embodiment, the portable screen device according an embodiment of the present invention further comprises a top bar fixed on an end of the screen, wherein the top bar is capable of pressing the part to be pressed upon the storage of the screen.

In a preferable embodiment, the first engagement part pivots about a rotatable connection part as a base point upon a press of the part to be pressed, thereby releasing the engagement of the first engagement part with the knurls of the rotary part, the rotatable connection part being configured to interconnect the part to be pressed with the first engagement part.

Effect of the Invention

In a portable screen device according to an embodiment of the present invention, it is possible to to eliminate a slack of a screen pulled out.

BRIEF DESCRIPTION OF THE DRAWINGS

FIG. 7B is a side view schematically showing a portable screen device comprising a lever mechanism.

FIG. 7C is a schematic view showing a state that a screen in an extension state is partially pulled back in a direction opposite to a pull out direction by using a portable screen device comprising a lever mechanism.

MODES FOR CARRYING OUT THE INVENTION

Before specifically describing a portable screen device according to an embodiment of the present invention, it is described that the present invention has been created based on what technical idea. Specifically, the present invention has been created by the inventors of the present invention based on such a technical idea that a slack arising in a screen in an extension state is eliminated, the screen being a composition element of the portable screen devise.

Hereinafter, a portable screen device according to an embodiment of the present invention will be described in consideration of the technical idea.

<<Configuration of Portable Screen Device>>

A configuration of a portable screen device according to an embodiment of the present invention will be described with reference to drawings.

Figure 1A:
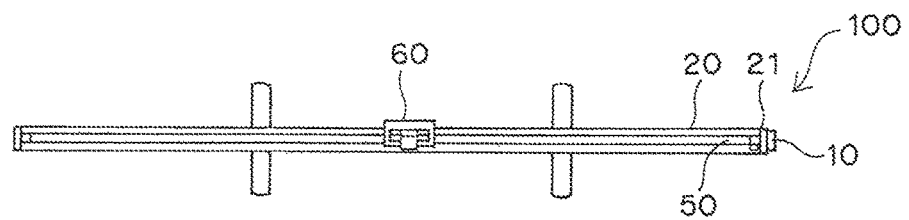
FIG. 1A is a top view schematically showing a portable screen device in an extension state according to an embodiment of the present invention.
Figure 1B:
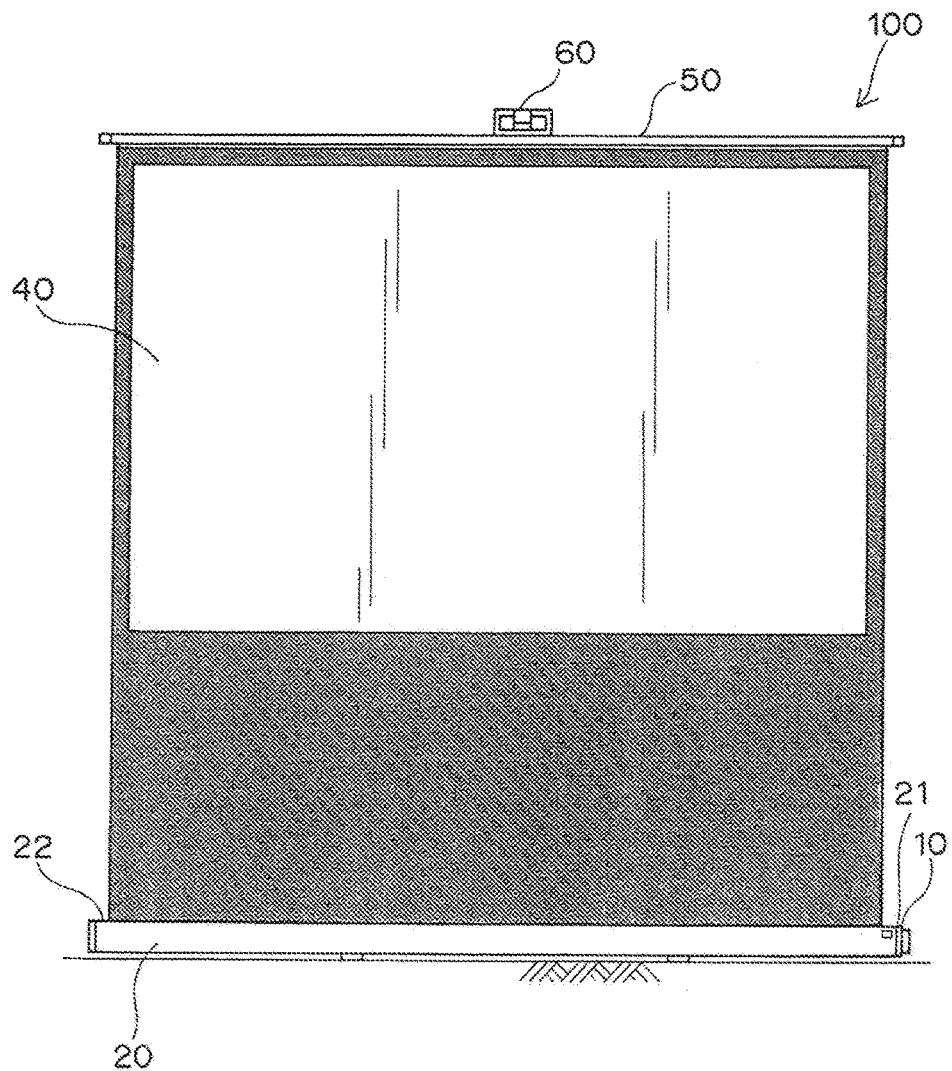
FIG. 1B is an elevation view schematically showing a portable screen device in an extension state according to an embodiment of the present invention.
Figure 1C:
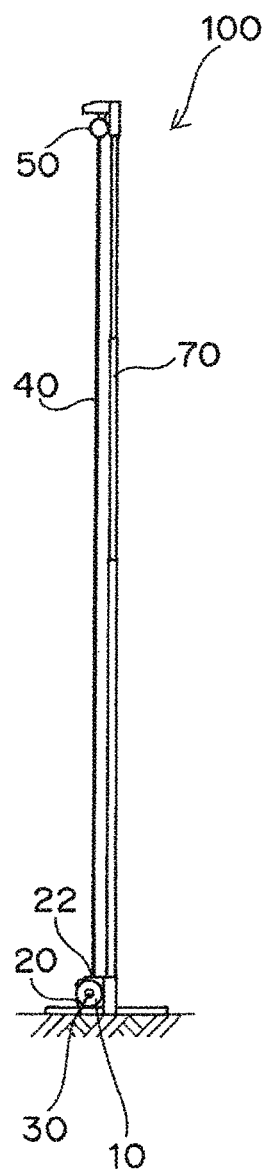
FIG. 1C is a side view schematically showing a portable screen device in an extension state according to an embodiment of the present invention.

FIG. 1A is a top view schematically showing a portable screen device in an extension state according to an embodiment of the present invention. FIG. 1B is an elevation view schematically showing a portable screen device in an extension state according to an embodiment of the present invention. FIG. 1C is a side view schematically showing a portable screen device in an extension state according to an embodiment of the present invention.

<Whole Configuration of Portable Screen Device>

A configuration of the portable screen device according to an embodiment of the present invention will be described herein. As shown in FIGS. 1A to 1C, the portable screen device 100 according to an embodiment of the present invention includes a casing 20, a roll 30, a screen 40, a top bar 50, a handle 60, and a screen support part 70.

The casing 20 is configured to be installed at an arbitrary location. The casing 20 includes an opening 22 and an inclined portion 23, the opening extending in a longitudinal direction and being provided on an upper surface of the casing. The roll 30 is rotatably placed in the casing 20. The screen 40 is wound on the roll 30 during a storage and is pulled out from the opening 22 of the casing 20 upon an use. The One of ends of the screen 40 is fixed on the roll 30, while the other of ends of the screen 40 is fixed on the top bar 50. The top bar 50 functions as a lid portion for closing the opening 22 of the casing 20 when the screen 40 is housed in the casing 20. The handle 60 is disposed at a center portion of the top bar 50 and constitutes a grab portion for pulling the screen 40 vertically upward from an arbitrary installation position of the casing 20. The screen support part 70 is a part for fixedly supporting the screen 40 pulled out and subsequently extended in a vertically upward direction, the screen support part corresponding to a bar part. As shown in FIGS. 1A to 1C, for example, the grab portion constituted by the handle 60 may be hooked on a hook portion provided at a distal end portion of the screen support part 70, so that the screen 40 can be supported.

As a result of intensive considerations based on such the technical idea that the slack arising in the screen in the extension state is eliminated as described above, the inventors of the present invention have found that in addition to the components of the portable screen device 100 described above, a "dial mechanism 10" is provided as a new component as shown in FIGS. 1A to 1C, the dial mechanism 10 being positioned at a side portion 21 of the casing 20.

Figure 6:
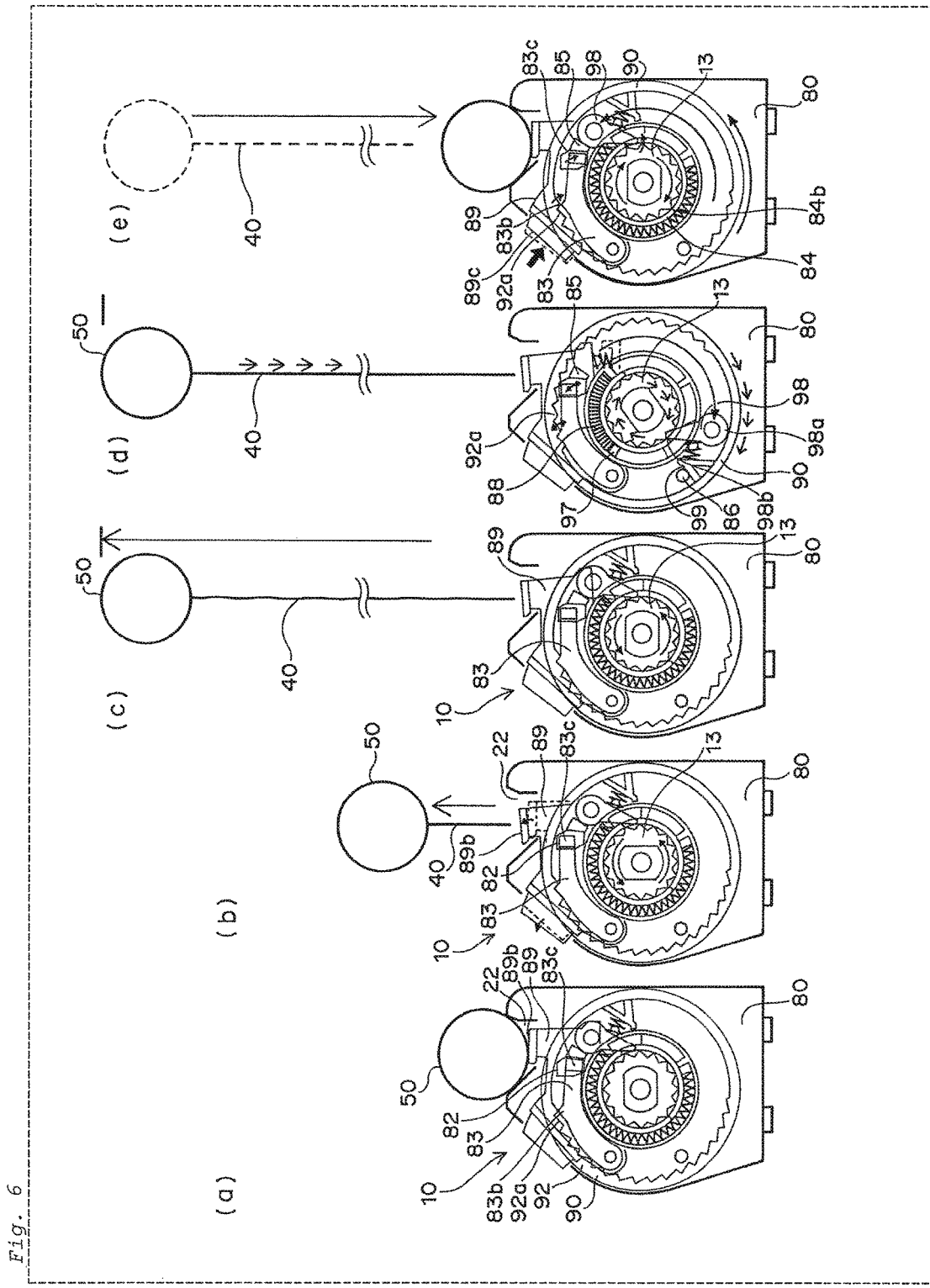
FIG. 6 is an operation flow diagram of a portable screen device according to an embodiment of the present invention. ((a) of FIG. 6 is a schematic view showing a state prior to a pull out of a screen. (b) of FIG. 6 is a schematic view showing a state upon the pull out of the screen from the casing. (c) of FIG. 6 is a schematic view showing a state from the pull out of the screen to an extension thereof. (d) of FIG. 6 is a schematic view showing a state that a screen in an extension state is partially pulled back in a direction opposite to the pull out direction. (e) of FIG. 6 is a schematic view showing a state that a screen is completely wound onto rolls in a casing.)

Definitions of terms and expressions as used herein are as follows. (1) The term "Dial mechanism" as used herein means a mechanism having a rotating function in a broad sense. As shown in FIG. 6 (d), the term "dial mechanism" as used herein means a mechanism which acts on a screen in an extension state in the narrow sense when it rotates in one direction. On the other hand, the term "dial mechanism" as used herein means a mechanism which does not act on the screen in an extension state when it rotates in an opposite direction. The act state on the extended screen means a state that the screen in the extension state can be pulled back in a vertical downward direction at a point in time when the dial mechanism rotates in one direction. Namely, the term "dial mechanism" as used herein can be referred to as a mechanism capable of acting upon one direction rotation. (2) The phrase "the screen in the extension state is partially pulled back" as used herein means that the roll connected with the dial mechanism is rotated by less than 360 degrees in a pull back direction after driving the dial mechanism, so that the screen provided on the roll is pulled back in the pull back direction, as shown in FIG. 6 (d) for example. (3) The phrase "the dial mechanism provides the screen in the extension state with a tension" as used herein means a state in which the screen is extended or stretched in the pull back direction as shown in FIG. 6 (d), the pull back direction corresponding to a vertical downward direction. (4) The term "gear" as used herein means a structure including a plurality of knurls at a peripheral portion thereof as shown in FIGS. 6 (c) and 6 (d). The term "gear" as used herein means one which engages with an engagement part when it rotates in one direction and which does not engage with the engagement part when it rotates in a direction opposite to the one direction. (5) The term "rotary part" as used herein is a component of the dial mechanism as shown in FIG. 6 (d) for example, and is a part for realizing a rotating function of the dial mechanism. (6) The phrase "a first engagement part sequentially engages with knurls of the rotary part" as used herein means a state that the first engagement part sequentially can engage with each of a plurality of the knurls moving in one direction in accordance with a rotation of the rotary part as shown in FIG. 6(d). (7) The term "part to be pressed" as used herein means a part which is pressed in a gravity direction by a direct contact with the top bar to be positioned at the opening of the casing, as shown in FIG. 6 (e) for example, the gravity direction being a downward direction. The "part to be pressed" as used herein specifically means a part which is capable of solving a problem that a pull up of the screen is difficult at an initial stage of the pull up thereof. (8) The term "Journaling" as used herein means a state that a connection part is rotatable, the connection part being specifically a connection part in a form of a shaft. (9) The term "swing movement" as used herein means a pivot movement about a rotatable connection part as a base point or a center point, the connection part being specifically a connection part in a form of a shaft.

Hereinafter, the dial mechanism 10 will be described.

Figure 2A:
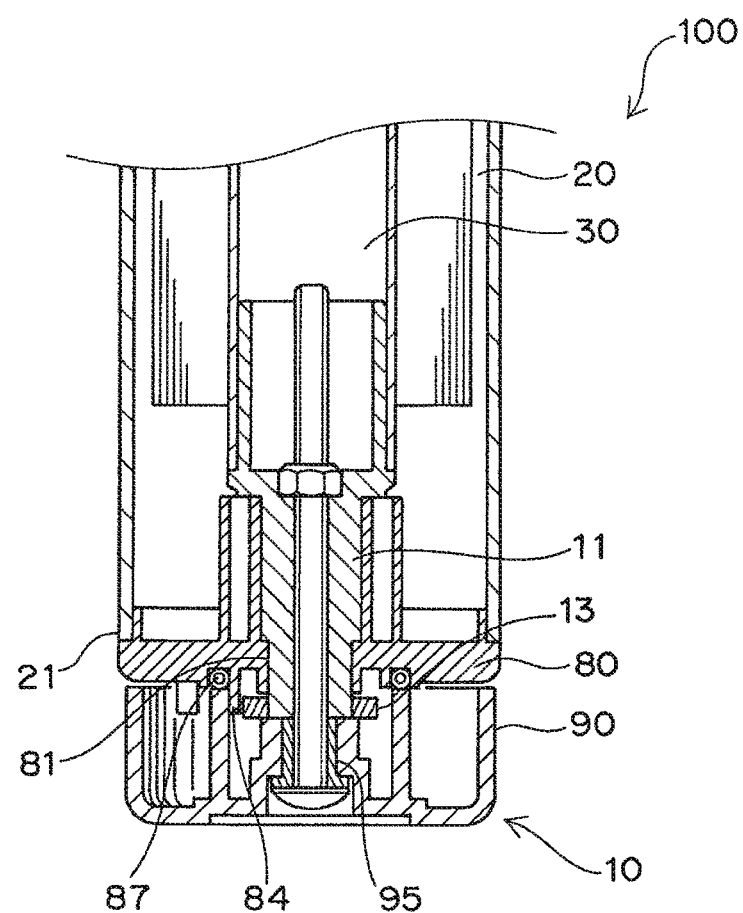
FIG. 2A is a top view schematically showing a dial mechanism of a portable screen device prior to a pull out according to an embodiment of the present invention.
Figure 2B:
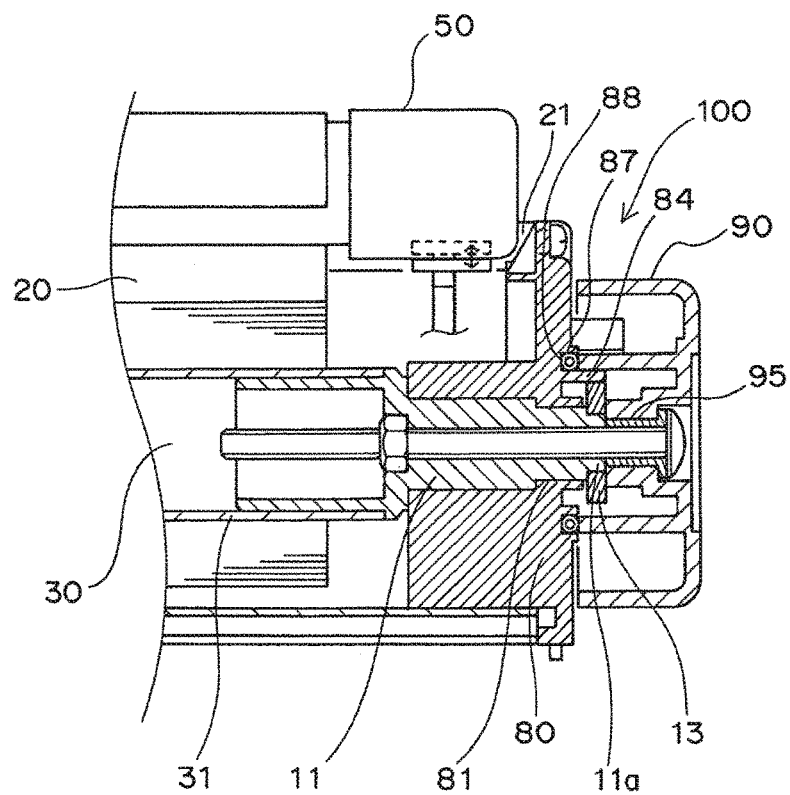
FIG. 2B is a cross-sectional view schematically showing a dial mechanism of a portable screen device prior to a pull out according to an embodiment of the present invention.
Figure 2C:
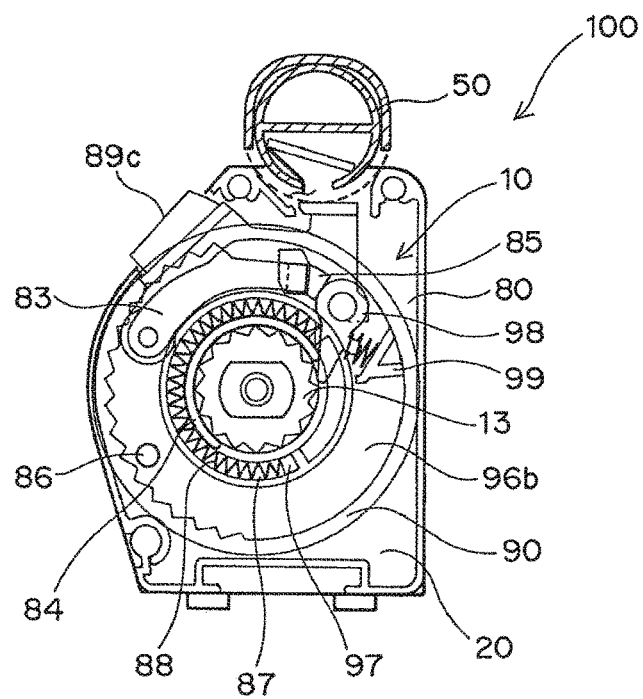
FIG. 2C is an elevation view schematically showing a dial mechanism of a portable screen device prior to a pull out according to an embodiment of the present invention.
Figure 2D:
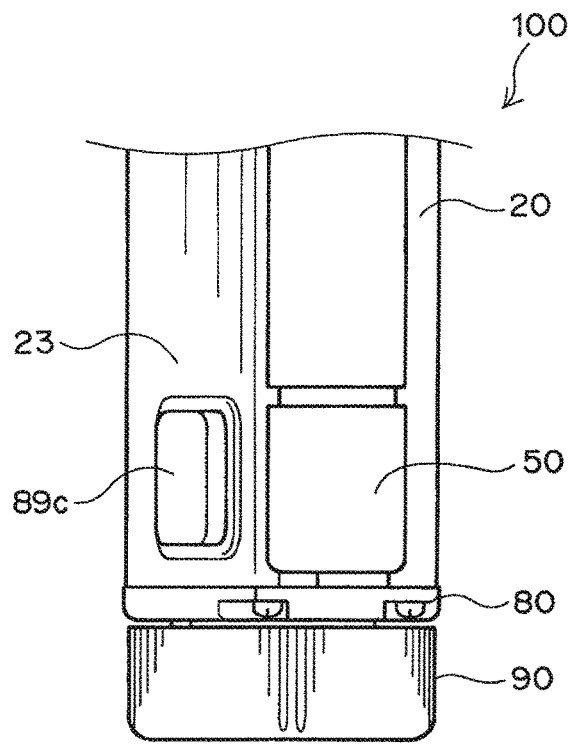
FIG. 2D is an external top view schematically showing an end portion of a portable screen device according to an embodiment of the present invention.
Figure 2E:
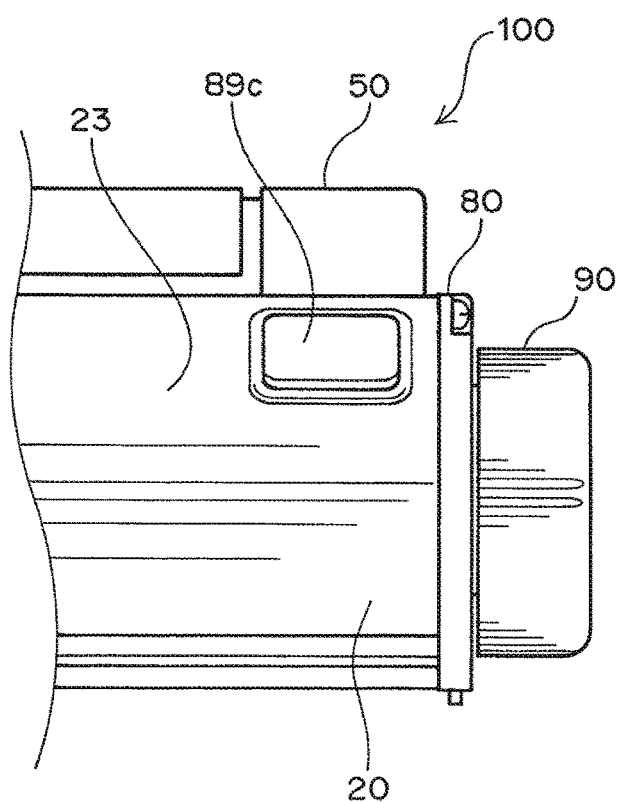
FIG. 2E is an external side view schematically showing an end portion of a portable screen device according to an embodiment of the present invention.
Figure 2F:
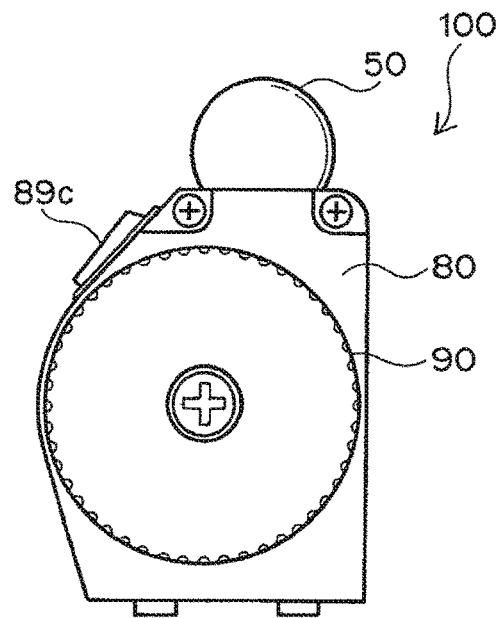
FIG. 2F is an external elevation view schematically showing a portable screen device according to an embodiment of the present invention.

FIG. 2A is a top view schematically showing a dial mechanism of a portable screen device prior to a pull out according to an embodiment of the present invention. FIG. 2B is a cross-sectional view schematically showing a dial mechanism of a portable screen device prior to a pull out according to an embodiment of the present invention. FIG. 2C is an elevation view schematically showing a dial mechanism of a portable screen device prior to a pull out according to an embodiment of the present invention. FIG. 2D is an external top view schematically showing an end portion of a portable screen device according to an embodiment of the present invention. FIG. 2E is an external side view schematically showing an end portion of a portable screen device according to an embodiment of the present invention. FIG. 2F is an external elevation view schematically showing a portable screen device according to an embodiment of the present invention.

(Brief/Broad Configuration of Dial Mechanism)

A brief/broad configuration of the dial mechanism 10 will be described.

As shown in FIGS. 2A to 2F, the dial mechanism 10 includes a combination of a shaft 11, a gear 13, a base plate 80, a rotary part 90, a first engagement part 83, and a second engagement part 98, the shaft 11 being connected to an end portion 31 of the roll 30, the gear 13 being connected to an end portion 11 a of the shaft 11, the base plate 80 being located on the side portion 21 of the casing 20 from an inside of the casing toward an outside thereof, the rotary part 90 being positioned above the base plate 80 from an inside of the casing toward an outside thereof, the first engagement part 83 being pivotably located on the base plate 80, the second engagement part 98 being pivotably located on the rotary part 90.

(Configuration of Base Plate)

A configuration of the base plate 80 which is a component of the dial mechanism 10 will be described hereinafter.

Figure 3A:
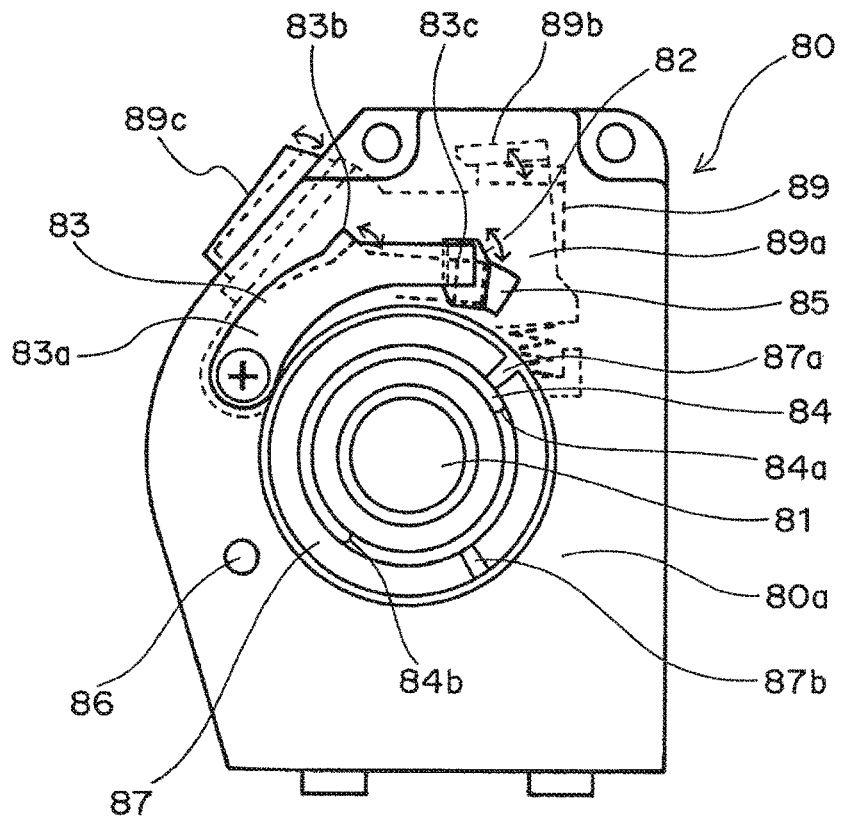
FIG. 3A is an elevation view schematically showing a base plate which is a component of a dial mechanism as seen from an outside toward an inside.
Figure 3B:
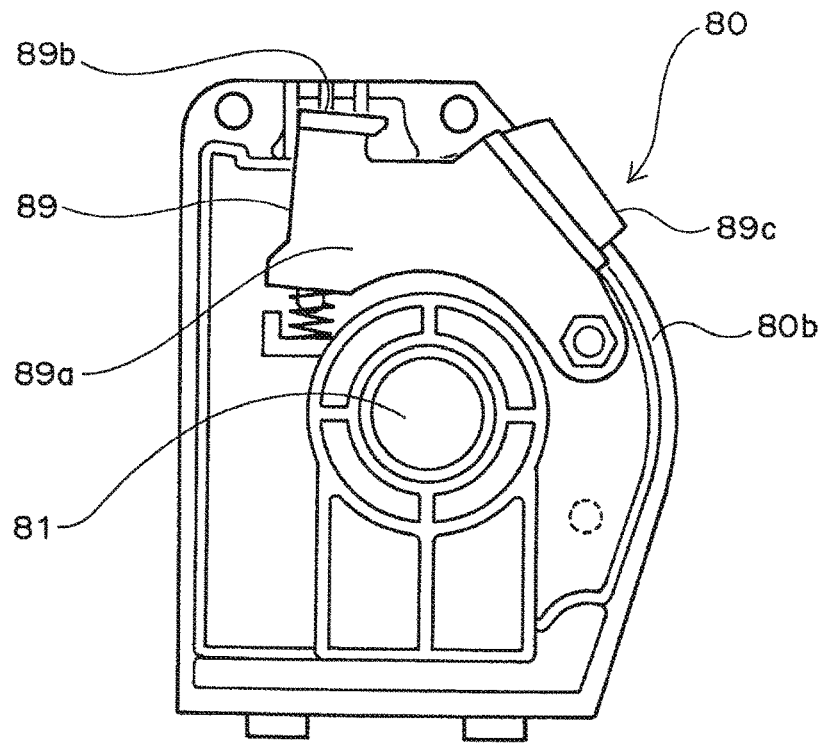
FIG. 3B is an elevation view schematically showing a base plate which is a component of a dial mechanism as seen from an inside toward an outside.
Figure 3C:
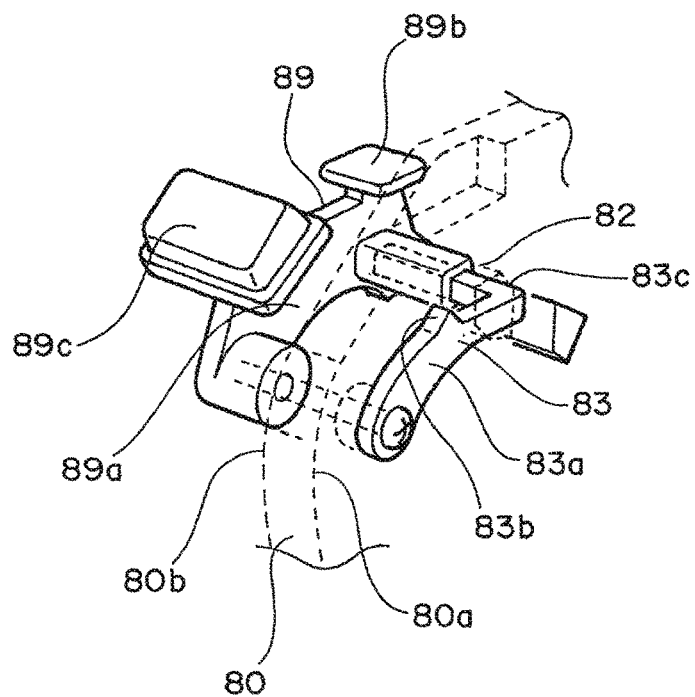
FIG. 3C is a perspective view schematically showing a first engagement part on an outer main surface of a base plate and a part to be pressed on an inner main surface of the base plate.

FIG. 3A is an elevation view schematically showing a base plate which is a component of a dial mechanism as seen from an outside toward an inside. FIG. 3B is an elevation view schematically showing a base plate which is a component of a dial mechanism as seen from an inside toward an outside. FIG. 3C is a perspective view schematically showing a first engagement part on an outer main surface of a base plate and a part to be pressed on an inner main surface of the base plate.

As shown in FIG. 3A, the base plate 80 includes substantially the same external/appearance as that of the side portion of the casing. The base plate 80 includes a first through hole 81 and a second through hole 82 each passing between an inner main surface of the base plate 80 and an outer main surface thereof. The first through hole 81 is a hole through which the shaft passes (see FIGS. 2A to 2 B). The second through hole 82 is a hole through which a bent portion of the first engagement part as described below.

The base plate 80 includes a first engagement part 83, a first projection portion 84, a second projection portion 85, a third projection portion 86, and a region 87 for storing an elastic part on the outer main surface 80 a of the base plate 80, each of the first projection portion 84, the second projection portion 85 and the third projection portion 86 projecting/extending outward, that is, toward an installed direction of the rotary part 90. The first projection portion 84 to the third projection portion 86 serve to control a movement range of the second engagement part of the rotary part 90 as described below. More specifically, as shown in FIG. 3A, the first projection portion 84 is a projection portion which has a concentric configuration with the through hole 81 and which is spaced apart from the through hole 81. The first projection portion 84 also a projection portion which has an extension arrangement from a first end portion 84 $a$ to a second end portion 84 $b$ such that the first projection portion 84 is in a form of a semicircle.

As shown in FIG. 3A, the region 87 for storing the elastic part is a region which has concentric configuration with the through hole 81 and extends from a first end portion 87 $a$ to a second end portion 87 $b$. The elastic part serves to return a second engagement part to an initial state (i.e., static state) before the second engagement part engages with the gear 13, the second engagement part being configured to be capable of engaging with the gear 13 and being located on the rotary part 90 as described below. As shown in FIG. 3A, the first engagement part 83 is disposed at a substantial upper side of the region for storing the elastic part 87 as seen from a front based on the elevation view. The first engagement part 83 includes a base portion 83 $a$, a protrusion portion 83 $b$, and a bent portion 83 $c$, the protrusion portion 83$b$ having a protrusion configuration from a side surface of the base portion 83 $a$, and the bent portion 83$c$ having a configuration bent in a direction substantially perpendicular to an extension direction of the protrusion portion 83$b$. The protrusion portion 83 $b$ of the first engagement part 83 is configured to be engageable with knurls at the rotary part as described below in a case that the dial mechanism is composed of a combination of components of the dial mechanism.

As shown in FIGS. 3A to 3C, the base plate 80 further includes a part to be pressed 89 and a second through hole 82 on the base plate 80, the part to be pressed 89 being located on the inner main surface 80 $b$, the second through hole 82 being a through hole different from the first through hole and a through hole passing between the inner main surface and the outer main surface of the base plate. The part to be pressed 89 includes a base portion 89 $a$, an upper surface portion 89 $b$ provided on an upper surface of the base portion 89 $a$, and a button portion 89 $c$ protruding from the base portion 89$a$. The base plate 80 includes a support part and an elastic part on the inner main surface of the base plate 80, the support part serving to support the part to be pressed 89 and being located below the part to be pressed 89, the elastic part being configured to connect the support part with a lower surface portion of the base portion 89$a$ of the part to be pressed 89.

As shown in FIG. 3C, the base portion 89 $a$ of the part to be pressed 89 is connected with the bent portion 83 $c$ of the first engagement part 83 which passes or extends through the second through hole 82 of the base plate 80. The base portion 89 $a$ of the part to be pressed 89 and the base portion 83 $a$ of the first engagement part 83 are journaled or pivotably located via a screw member passing through an internal of the base plate. The upper surface portion 89 $b$ of the part to be pressed 89 is configured so that the upper surface portion 89 $b$ and the one of ends of the top bar are in a contact with each other upon a storing of the screen into the casing. Due to such a configuration of the part to be pressed 90, the top bar serves to close the opening of the casing upon the storing of the screen, and also to contact the upper surface portion 89 $b$ of the part to be pressed 90, which allows a downward press of the part to be pressed 90.

As a result, the bent portion 83 $c$ of the first engagement part connected with the part to be pressed 89 is pressed down in conjunction with the downward movement of the part to be pressed 89. Namely, the first engagement part 83 is pivotally moved downward as a whole about a rotatable connection part as a base point, the rotatable connection part being configured to interconnect the base 89 $a$ of the part to be pressed 89 with the base 83 $a$ of the first engagement part 83 via the rotatable connection part. Thus, in a case that the dial mechanism is composed of a combination of components thereof, it is possible to release an engagement between the protrusion portion 83 $b$ of the first engagement part 83 and each of the knurls of the rotary part. Accordingly, upon a start for pulling the screen upwardly, it is possible to eliminate a problem that a pull up of the screen is difficult, the problem being caused by an engagement of the protrusion 83 $b$ of the first engagement part with each of the knurls of the rotary part. Furthermore, it is preferable that the second through hole 82 of the base plate 80 through which the bent portion 83 $c$ passes or extends has a space capable of pushing down the bent portion 83 $c$ of the first engagement part.

As shown in FIGS. 2D to 2F and FIGS. 3A to 3C, the button portion 89 $c$ of the part to be pressed 89 has a protrusion arrangement from the inclined portion 23 of the casing 20. Although the button portion 89 of the part to be pressed 89 is described in detail in the following operation process of the screen device, the button portion 89 serves to release the engagement between the protrusion portion 83 $b$ of the first engagement part 83 and the knurls 92$a$ of the rotary part 90 in the state that the screen is extended. Specifically, upon a press of the button portion 89 $c$, the part to be pressed 89 is pivotally moved about the rotatable connection part which connects the part to be pressed 89 and the first engagement part 83 with each other as a base point, and thereby the part 89 is pushed downward. As a result, the bent portion 83 $c$ of the first engagement part connected with the part to be pressed 89 is pushed down in conjunction with the downward movement of the part to be pressed 89. Thus, the first engagement part 83 is pivotally moved downward as a whole about the rotatable connection part as the base point, the rotatable connection part being configured to interconnect the part to be pressed 89 with the first engagement part 83 via the rotatable connection part. As a result, it is possible to release the engagement between the protrusion portion 83 $b$ of the first engagement part 83 and each of the knurls 92 $a$ of the rotary part 90. Accordingly, a wind of the screen onto the roll arranged in the casing is finally possible, although the above matters are described in detail in the operation process of the screen device below.

(Preferred Embodiment of Part to be Pressed)

Figure 4A:
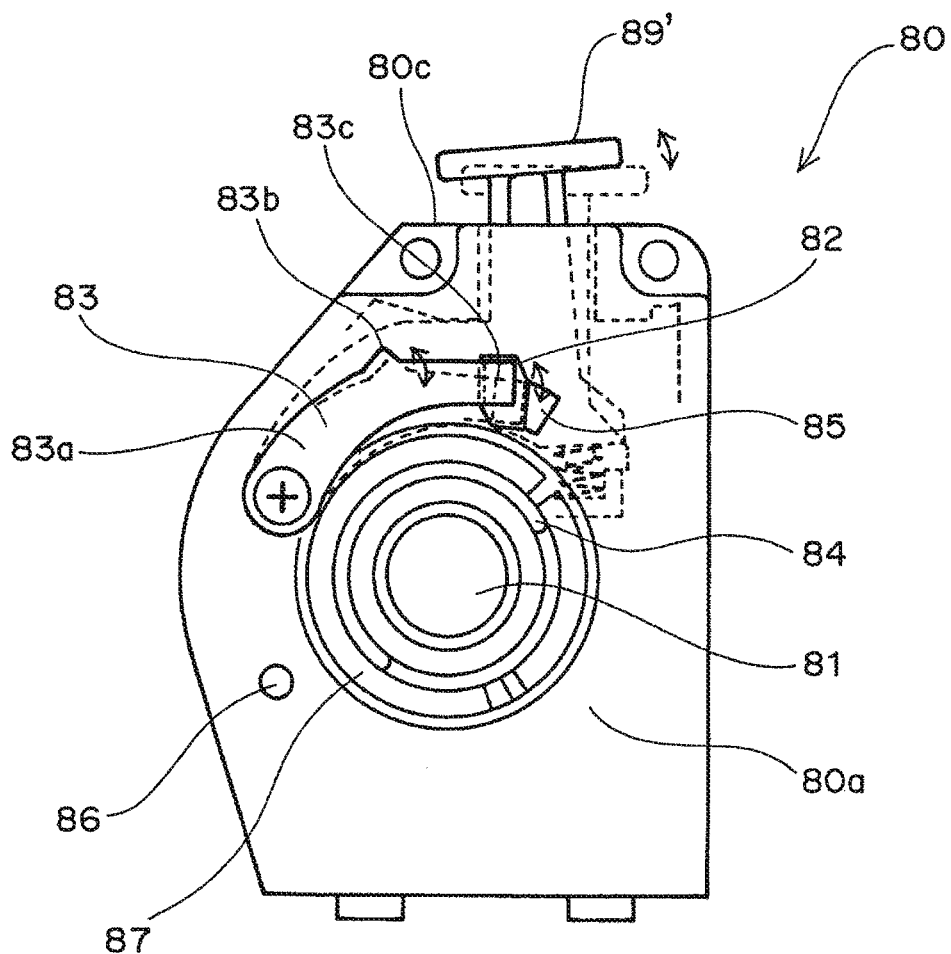
FIG. 4A is an elevation view schematically showing a base plate on which a part to be pressed in a preferred embodiment is disposed as seen from an outside toward an inside.
Figure 4B:
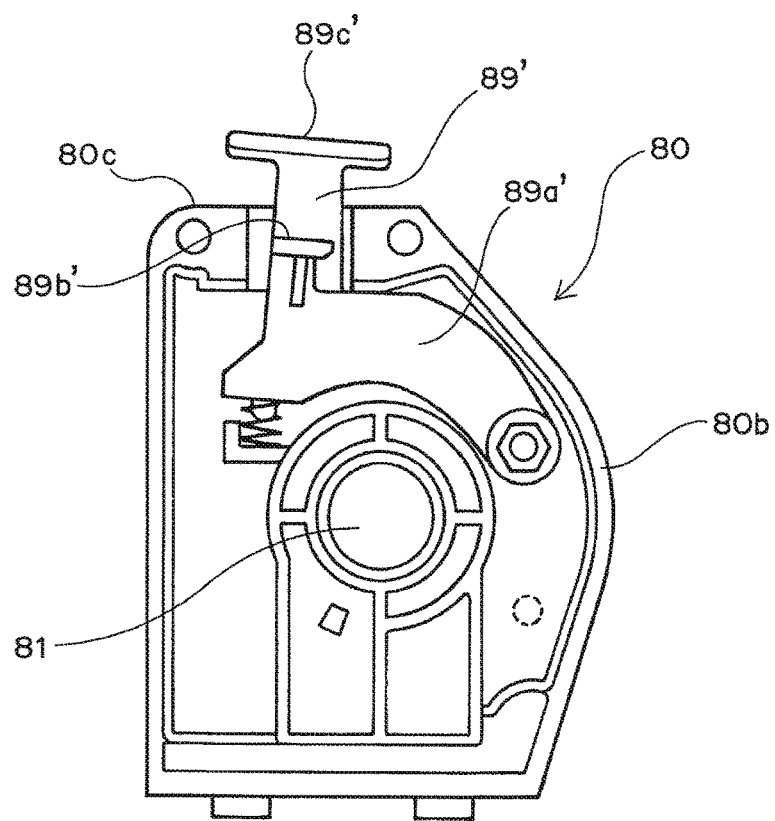
FIG. 4B is an elevation view schematically showing a base plate on which a part to be pressed in a preferred embodiment is disposed as seen from an inside toward an outside.
Figure 4C:
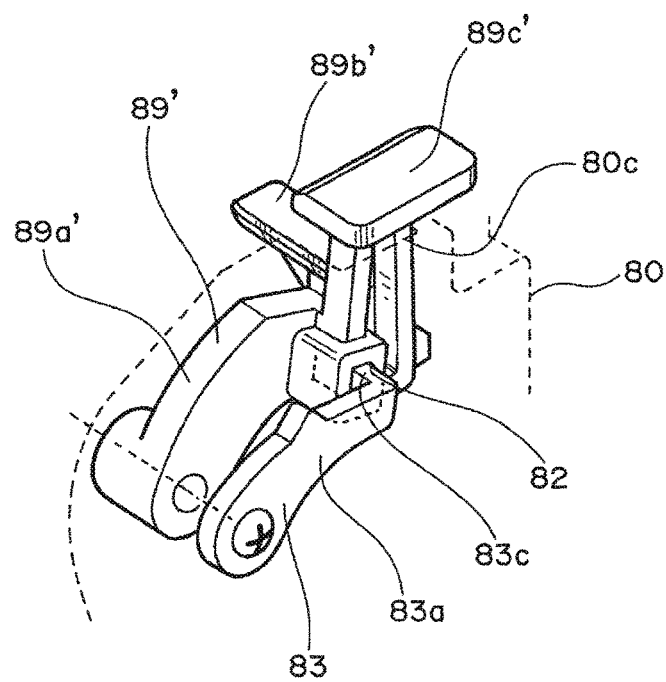
FIG. 4C is a perspective view schematically showing a first engagement part disposed on an outer main surface of the base plate and a part to be pressed in a preferred embodiment disposed on an inner main surface of the base plate.

As the part to be pressed, a use of one having a configuration shown in FIGS. 4A to 4C is preferable.

Specifically, the part to be pressed 89' shown in FIGS. 4A to 4C includes a base portion 89$a$', an upper surface portion 89$b$' provided on the upper surface of the base portion 89$a$', and a button portion 89$c$'. The description of a configuration, and actions and effects due to the configuration) as to the base portion 89$a$' and the upper surface portion 89$b$' of the part to be pressed 89' will be omitted to avoid redundant descriptions, since each of the base portion 89$a$ and the upper surface portion 89$b$ of the part to be pressed 89 shown in FIGS. 3A to 3C has the same configuration as that of each of those shown in FIGS. 4A to 4C.

The button portion 89 *c'* of the part to be pressed 89' serves to release the engagement of the protrusion 83 *b* of the first engagement part 83 and each of the knurls 92 *a* of the rotary part 90 in a state that the screen is extended, similarly to the button portion 89 *c* shown in FIGS. 3A to 3C. In contrast to the button portion 89 *c* shown in FIGS. 3A to 3C, the button portion 89 *c'* of the part to be pressed 89' is configured such that it has an extension arrangement upward from a side surface of the base portion 89 *a'* and also has a protrusion arrangement from an upper surface 80 *c* of the base plate 80. Namely, a position of the button portion 89 *c'* is different from that of the button portion 89 *c* shown in FIGS. 3A to C which has a protrusion arrangement from the inclined portion 23 of the casing 20. In a case that the button portion 89 *c'* of the part to be pressed 89' has the protrusion arrangement from the upper surface 80 *c* of the base plate 80, it allows an avoidance of a risk of an unexpected or unintentional contact of the user's finger or the like to the button portion 89 *c'* of the part to be pressed 89'. Namely, only as necessary, a press of the button portion 89' is possible. Specifically, only as necessary, it is possible to downwardly move the part to be pressed 89' by a pivot movement of the part to be pressed 89' about the rotatable connection part as the base point, the rotatable connection part being configured to interconnect the part to be pressed 89' with the first engagement part 83 via the rotatable connection part. Thus, only as necessary, the bent portion 83 *c* of the first engagement part which is connected with the part to be pressed 89' can be pushed down in conjunction with the downward movement of the part to be pressed 89'. Therefore, only as necessary, the first engagement part 83 can be pivoted downwardly as a whole in conjunction with the rotatable connection part as the base point, the rotatable connection part being configured to interconnect the part to be pressed 89' with the first engagement part 83 via the rotatable connection part. The downward pivot movement only as necessary of the first engagement part 83 makes it possible to release the engagement between the protrusion portion 83 *b* of the first engagement part 83 and each of the knurls 92 *a* of the rotary part 90, only as necessary in a state that the screen is extended. Accordingly, a wind of the screen onto the roll arranged in the casing is finally possible only as necessary, although the above matters are described in detail in the operation process of the screen device below.

(Configuration of Rotary Part)

A configuration of the rotary part 90 which is a component of the dial mechanism 10 will be described hereinafter.

Figure 5A:
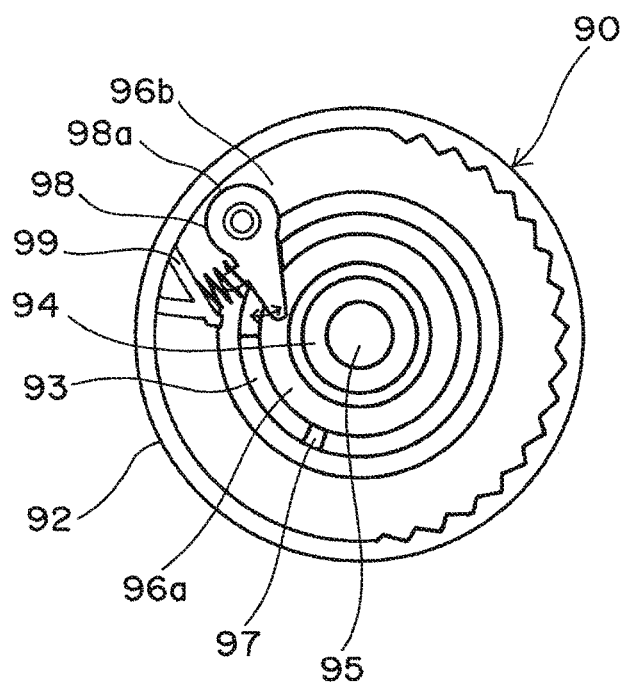
FIG. 5A is an elevation view schematically showing a rotary part which is a component of the dial mechanism as seen from the inside toward the outside.
Figure 5B:
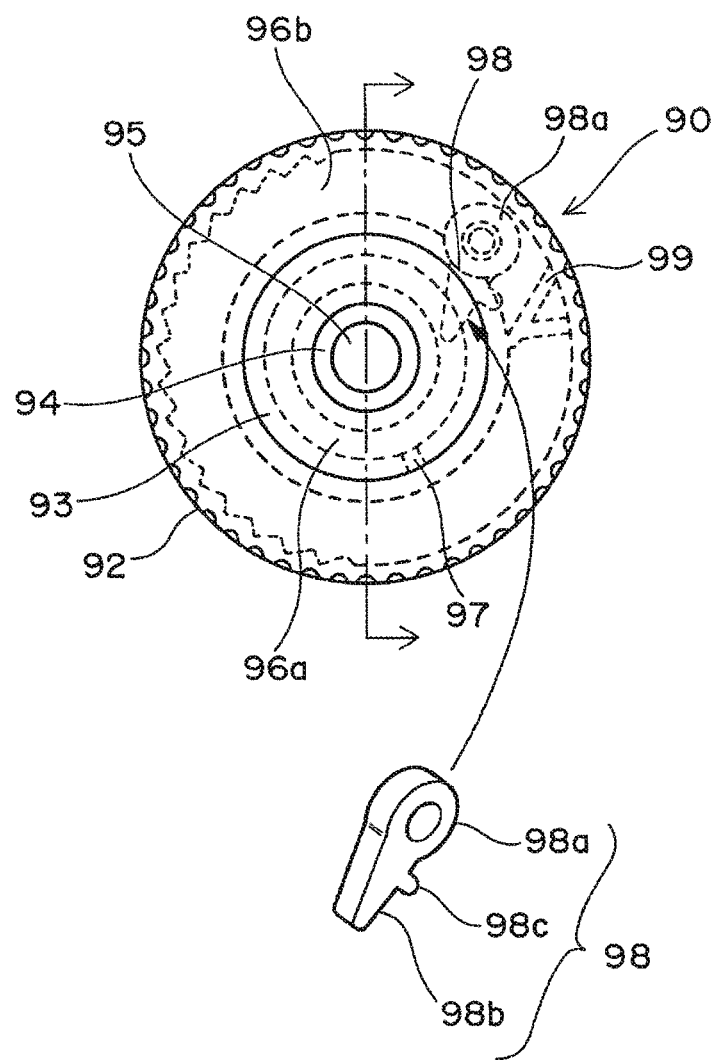
FIG. 5B is an elevation view schematically showing the rotary part which is a component of the dial mechanism as seen from the outside toward the inside.
Figure 5C:
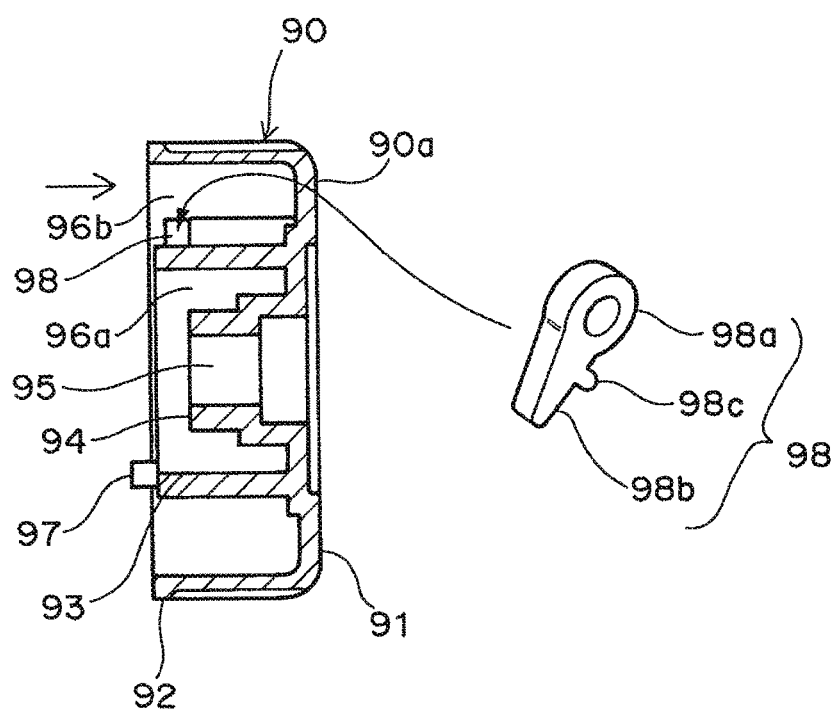
FIG. 5C is a cross-sectional view schematically showing a rotary part which is a component of the dial mechanism.

FIG. 5A is an elevation view schematically showing a rotary part which is a component of the dial mechanism as seen from the inside toward the outside. FIG. 5B is an elevation view schematically showing the rotary part which is a component of the dial mechanism as seen from the outside toward the inside. FIG. 5C is a cross-sectional view schematically showing a rotary part which is a component of the dial mechanism.

As shown in FIGS. 5A to 5C, the rotary part 90 includes a main surface 91, a side surface 92 positioned at an outermost periphery, a side surface 93 positioned at an inner periphery, and a side surface 94 positioned at an innermost periphery. The side surface 92 positioned at the outermost periphery extends in a direction substantially perpendicular to the main surface 91 from the outside toward the inside, i.e., toward the installed direction of the base plate. The side surface 93 positioned at the inner periphery is spaced apart from the side surface 92 positioned at the outermost periphery. The side surface 94 positioned at the innermost periphery is spaced apart from the side surface 93 positioned at the inner periphery. A cylindrical cover portion 90 *a* is composed of the main surface 91 of the rotary part 90 and the side surface 92 positioned at the outermost periphery thereof. The side surface 92 positioned at the outermost periphery has knurls 92*a* on an inner side thereof.

The knurls 92*a* has a configuration in which each of knurls 92*a* is engageable with the first engagement part 83 on the base plate, when the dial mechanism is composed of a combination of respective components (see FIG. 2C). The rotary part 90 is rotatably provided by a connection part such as a screw through a through hole 95, the through hole 95 being composed of the side surface 94 positioned at the innermost periphery (see FIGS. 2A to 2 B). As shown in FIGS. 5A to 5C, the rotary part 90 includes first spaces 96 *a* between the side surface 93 positioned at the inner periphery and the side surface 94 positioned at the innermost periphery, the first spaces 96*a* having a concentric configuration with the through hole 95. The first spaces 96 *a* are configured to store the first protrusion portion of the base plate and gears connected with the shaft in a case that the dial mechanism is composed of a combination of the respective components (see FIGS. 2A to 2 B). The rotary part 90 includes a protrusion 97 located on an end portion of the side surface 93 positioned at the inner periphery. The protrusion 97 serves to press the one of ends of the elastic part 88 stored in the region 87 for storing the elastic part of the base plate such that the elastic member 88 is compressed (see FIG. 2C).

As shown in FIGS. 5A to 5C, the rotary part 90 includes a second space 96 *b* between the side surface 92 positioned at the outermost periphery and the side surface 93 positioned at the inner periphery 93, the second space 96*b* having a concentric configuration with the through hole 95. The second space 96 *b* has a second engagement part 98 pivotally located therein as shown in FIGS. 5A to 5C. The second space 96 *b* is configured to store the second projection part and the third projection part of the base plate, in a state that the dial mechanism is composed of a combination of respective components.

The second engagement part 98 includes a base portion 98 *a*, an extension portion 98 *b*, and a protrusion portion 98 *c*, the extension portion 98 *b* being configured to extend from the base portion 98 *a* in the second space to the first space 96 *a*, the protrusion portion 98 *c* protruding in a direction perpendicular to an extension direction of the extension portion. The protrusion portion 98 *c* of the second engagement part 98 is in a connection with a support part 99 for supporting the second engagement part via an elastic part, the support part 99 having a V shape, the support part 99 being provided on an inner side area of the side surface 92 positioned at the outermost periphery of the rotary part 90.

In detail, a region of a movement of the second engagement part 98 is controlled between the second projection portion and the third projection portion of the base plate, each of which stored in the second space 96 *b*, in a case that the dial mechanism is composed of a combination of the respective components (see FIG. 2C). In a case that the dial mechanism is composed of a combination of the respective components, the extension portion 98 *b* of the second engagement part has its side surface contacting each of a first end portion and a second end portion of the first projection part of the base plate, the first projection portion being configured to project into the first space 96 *a*. Furthermore, the extension portion 98 *b* of the second engagement part has an end configured to be capable of engaging with the gear stored in the first space 96 *a*, in a state of a construction of the dial mechanism 10 (see FIG. 2C).

<<Operation of Portable Screen Device>>

An operation of the portable screen device according to an embodiment of the present invention will be described hereinafter.

FIG. 6 is an operation flow diagram of a portable screen device according to an embodiment of the present invention. ((a) of FIG. 6 is a schematic view showing a state prior to a pull out of a screen. (b) of FIG. 6 is a schematic view showing a state upon the pull out of the screen from the casing. (c) of FIG. 6 is a schematic view showing a state from the pull out of the screen to an extension thereof. (d) of FIG. 6 is a schematic view showing a state that a screen in an extension state is partially pulled back in a direction opposite to the pull out direction. (e) of FIG. 6 is a schematic view showing a state that a screen is completely wound onto rolls in a casing.) (a) to (e) of FIG. 6 is a state of a combination of the respective components of the dial mechanism.

<1. Prior to Pull Out of Screen>

A state prior to a pull out of the screen will be described hereinafter.

As shown in (a) of FIG. 6, at a point in time before the screen is pulled out, the top bar 50 closes the opening 22 of the casing and also contacts the upper surface portion 89 b of the part to be pressed 89, thereby pressing the part 89 downwardly. As a result, the bent portion 83 c of the first engagement part 83 is pressed downwardly in conjunction with the downward movement of the part to be pressed 89, the bent portion 83 of the first engagement part 83 being in a connection with the part to be pressed 89 and passing through the second through hole 82 of the base plate 80. Specifically, the first engagement part 83 is pivoted downwardly about the rotatable connection part as the base point, the rotatable connection part being configured to interconnect the part to be pressed 89 with the first engagement part 83 via the rotatable connection part.

The downward press of the bent portion 83 c of the first engagement part 83 makes it possible to avoid the engagement of the protrusion portion 83 b of the first engagement part 83 with each of the knurls 92a on the inner side portion of the side surface 92 positioned at the outermost periphery of the rotary part 90. Accordingly, upon a start for pulling the screen upwardly, it is possible to eliminate a problem that a pull up of the screen is difficult, the problem being caused by the engagement of the protrusion 83 b of the first engagement part 83 with each of the knurls 92a of the rotary part. Prior to the pull out of the screen shown in (a) of FIG. 6, components of the dial mechanism 10 other than the part to be pressed 89 and the first engagement part 83 are not in a movement state.

<2. Upon Pull Out of Screen>

A state upon a pull out of the screen will be described hereinafter.

As shown in (b) of FIG. 6, upon the pull out of the screen 40 in a vertical upward direction, at a point in time when the top bar 50 is spaced apart from the opening 22 of the casing, a contact of the top bar 50 with the upper surface portion 89 b of the part to be pressed 89 is released. Thus, the release of the contact therebetween allows an expansion of the elastic part, the elastic part serving to connect the part to be pressed 89 and the support part for supporting the part to be pressed positioned below the part to be pressed. As a result, the expansion of the elastic part allows an upward pivot movement of the part to be pressed 89 about the rotatable connection part as a base point, the rotatable connection part being configured to interconnect the part to be pressed 89 with the first engagement part 83 via the rotatable connection part.

With the upward pivot movement of the part to be pressed 89, the bent portion 83 c of the first engagement part 83 connected with the part to be pressed 89 is upwardly moved in the second through hole 82 of the base plate 80. Accordingly, the upward movement of the bent portion 83c makes it possible to upwardly pivot the first engagement part 83 as a whole about the rotatable connection part, the rotatable connection part being configured to interconnect the part to be pressed 89 with the first engagement part 83 via the rotatable connection part.

Upon the pull out of the screen in the vertical upward direction, the roll on which the screen is wound is rotated in the pull out direction, i.e., counterclockwise direction. As a result, in conjunction with the rotation of the roll, the shaft connected to the roll rotates in the pull out direction, and thereby the gear 13 connected to the shaft also rotates in the pull out direction as shown in (b) of FIG. 6. Upon the pull out of the screen shown in (b) of FIG. 6, the other components of the dial mechanism 10 other than the part to be pressed 89, the first engagement part 83, the shaft, and the gear 13 connected to the shaft are not in a movement state.

<3. Process from Pull Out of Screen to Extension of Screen>

A state from a pull out of the screen to an extension thereof will be described hereinafter.

As shown in (c) of FIG. 6, the top bar 50 is pulled up to the highest height level to pull out the screen 40 in the vertical upward direction, and thereby the screen is subjected to an extension state. Upon the pull up of the top bar 50, the roll on which the screen is wound is rotated in the pull out direction (i.e., counterclockwise direction). As a result, in conjunction with the rotation of the roll, the shaft in a connection with the roll is rotated in the unwinding direction, whereby the gear 13 in a connection with the shaft is also rotated in the pull out direction as shown in (c) of FIG. 6. Upon the extension of the screen as shown in (c) of FIG. 6, other components of the dial mechanism 10 other than the part to be pressed 89, the first engagement part 83, the shaft, and the gear connected to the shaft are not in a movement state.

<4. Partial Pull Back of Screen in Extension State>

A process for pulling only a part of the screen in the extension state back will be described hereinafter.

As shown in (d) of FIG. 6, in a state that the screen 40 is extended, the rotary part 90 is rotated in a direction opposite to the pull out direction (i.e., counterclockwise direction) of the screen 40, the opposite direction corresponding to a clockwise direction. As a result, a side surface of the extension portion 98 b of the second engagement part 98 contacts a first end portion 84 a of the first projection portion 84 in a form of a semicircular of the base plate 80, and thereby an extension direction of the extension portion 98 b of the second engagement part 98 is changed. Thus, a tip end portion of the extension portion 98 b is engaged with the gear 13.

In addition, the rotation of the rotary part 90 causes the second engagement part 98 and the support part 99 for the second engagement part to be concentrically moved in the clockwise direction. At this time, a range of the movement of the second engagement part 98 is that from an initial state to a state that the support part 99 for the second engagement part 98 is in a contact with the third projection portion 86 of the base plate 80, the initial state corresponding to a state that the base portion 98 *a* of the second engagement part 98 is in a contact with the second projection portion 85 of the base plate 80.

For example, the second engagement part 98 moves in the clockwise direction by up to about 150 degrees from the initial state (i.e., static state). Upon a contact of the support part 99 for the second engagement part 98 with the third projection portion 86 of the base plate 80, the second engagement part 98 is configured such that the side surface of the extension portion 98 *b* thereof is in a contact or a hit with a second end portion 84 *b* of the first projection portion 84 in the form of the semicircular of the base plate 80.

Due to the engagement of the tip end portion of the extension portion 98 *b* of the second engagement part 98 with the gear 13, the gear 13 also rotates by up to about 150 degrees in clockwise direction, in conjunction with the movement of the second engagement part 98 in the clockwise direction, the clockwise direction corresponding to a direction opposite to the pull out direction of the screen. Upon the rotation of the gear 13 in the clockwise direction, the shaft also rotates in clockwise direction by up to about 150 degrees due to a connection of the shaft with the gear 13. Upon the rotation of the shaft in the clockwise direction, the roll also rotates up to about 150 degrees in the clockwise direction due to a connection of roll with the shaft. Since the one of end sides of the screen 40 is fix/secured on the roll, the rotation of the roll in the clockwise direction by up to about 150 degrees causes a provision of a pull back force of only a part of the screen 40 in the extension state onto the roll. As a result, it is possible to apply a tension to the screen 40 in the extension state. In light of the above matters, the term "dial mechanism" as used herein can be more specifically referred to as a mechanism capable of applying a tension upon one direction rotation.

The application of the tension enables a slack arising in the screen 40 in the extension state to be eliminated. Therefore, even if an image from the projector is projected on the screen 40 in the extension state, it is possible to avoid such a problem of an occurrence of a distortion of the image projected on the screen 40. For example, even on a condition of a use of a short focus projector positioned at a close distance from the screen, there is no problem of the distortion of projected image, the close distance between the short focus projector and the screen being 50 to 150 cm. In particular, even if the image is projected onto the screen in the extension state from an obliquely downward direction of the installed position of the screen by using an ultrashort focus projector arranged at a very close distance from the screen, there is no problem of the distortion of projected image, the very close distance between the ultrashort focus projector and the screen being less than 50 cm. Namely, the portable screen device according to an embodiment of the present invention can be used as a screen device for an ultrashort focus projector. Due to the avoidance for the distortion of the projected image on the screen in the extension state by using the portable screen device according to an embodiment of the present invention, an accurate projection of the image on the screen is possible. Therefore, the viewer can adequately understand contents in the image projected on the screen in the extension state.

In a case that the gear 13 is rotated in the clockwise direction, i.e., the direction opposite to the pull out direction of the screen, in accordance with the rotation of the second engagement part 98 due to the rotation of the rotary part 90, a movement of the first engagement part 83 is as follows. As shown in (d) of FIG. 6, in accordance with the rotation of the rotary part 90, the knurls 92 *a* of the rotary part move in the clockwise direction from the initial state shown in (a) to (c) of FIG. 6. In accordance with the movement of the rotary part having the knurls, the protrusion portion 83 *b* of the first engagement part 83 sequentially and gradually engages with each of the knurls 92*a* of the rotary part moving in the clockwise direction, the first engagement part 83 serving to be capable of pivotal movement about the rotatable connection part, the rotatable connection part being configured to interconnect the part to be pressed with the first engagement part via the rotatable connection part.

The engagement of the protrusion portion 83 *b* with each of the knurls 92*a* of the rotary part can prevent the gear 13 rotated in the clockwise direction from rotating in the counterclockwise direction (i.e., the direction in which the screen is pulled out), the rotation of the gear being due to a movement of the second engagement part 98 engaged with the gear. Thus, it is possible to maintain the state of the application of the tension to the screen 40 in the extension state. Accordingly, the maintenance of the tension application can lead to a continuance of a state that the slack arising in the screen 40 in the extension state is eliminated.

Upon the rotation of gear 13 in the clockwise direction by the second engagement part 98 with which the gear 13 engages in accordance with the rotation of the rotary part 90, a movement for the protrusion portion 97 of the rotary part 90 is as follows. Specifically, in accordance with the rotation in the clockwise direction of the rotary part 90, the protrusion portion 97 of the rotary part 90 presses one end of the elastic part 88 stored in the region for storing the elastic part 87 on the base plate 80. Thus, the press to the one of ends of the elastic part 88 causes the elastic part 88 to be compressed in the clockwise direction (see FIG. 2C).

<5. Winding of Screen>

A state that the screen in the extension state is completely wound onto the roll in the casing will be described hereinafter.

As shown in (e) of FIG. 6, a push of the button portion 89 *c* of the part to be pressed 89 is performed. In a state of the push of the button portion 89 *c*, the part to be pressed 89 is pivoted downwardly as a whole about the rotatable connection part as a base point, and thereby a push down of the part to be pressed 89 is performed, the rotatable connection part being configured to interconnect the part to be pressed 89 with the first engagement part 83 via the rotatable connection part. As a result, a push down of the bent portion 83 *c* of the first engagement part connected with the part 89 is possible in conjunction with the downward pivot movement of the part to be pressed 89. Thus, the first engagement part 83 can be pivoted downwardly as a whole about the rotatable connection part as the base point, the rotatable connection part being configured to interconnect the part to be pressed 89 with the first engagement part 83 via the rotatable connection part. As a result, the engagement between the protrusion portion 83 *b* of the first engagement part 83 and each of the knurls 92 *a* of the rotary part 90 is released. Namely, the engagement between the first engagement part 83 and each of the knurls 92 *a* is released. Furthermore, the rotary part 90 is slightly rotated in the clockwise direction so that the side surface of the extension portion 98 of the second engagement part 98 abuts with the second end portion 84 *b* of the first projection portion 84 of the base plate, and thereby engagement of the gear 13 with the second engagement part 98 is released.

The state of the engagement release causes the maintenance of the tension application to the screen 40 in the extension state to be released. Therefore, the compressed elastic part 88 shown in (d) of FIG. 6 is in an expansion in the counterclockwise direction. In accordance with the expansion of the elastic part 88, the elastic part 88 pushes the protrusion portion 97 of the rotary part 90 in the region for storing the elastic part in the counterclockwise direction. As a result, the pushing of the protrusion portion 97 of the rotary part 90 causes whole of the rotary part 90 to be rotated in the counterclockwise direction. Then, the rotation of the rotary part 90 causes a concentric movement of the second engagement part 98 disposed on the rotary part 90 until the base portion 98 *a* of the second engagement part hits the second projection portion 85 projecting from the base plate 80. As a result, it is possible to return the second engagement part 98 back in an initial state (i.e., stationary state).

In a state that the second engagement part 98 is returned back in the initial state, the dial mechanism including the rotary part 90 does not function to apply the tension to the screen 40 in the extension state. Therefore, as shown in (e) of FIG. 6, it is possible to wind the screens in the extension state as a whole onto the rolls in the casing.

Although the portable screen device according to an embodiment of the present invention has been described hereinbefore, the present invention is not limited to the above embodiments. It will be readily appreciated by the skilled person that various modifications are possible without departing from the scope of the present invention.

It has been described hereinbefore that the "dial mechanism" contributes to the pull back of a part of the screen in the state of the extension in the pull back direction (i.e., substantially vertically downward direction), for the application of the tension to the screen in an extension state, the extension state being achieved by the pull up of the screen in a substantially vertical upward direction.

However, the present invention is not limited to the embodiment wherein the dial mechanism is used, and the following embodiments may be adopted.

Figure 7A:
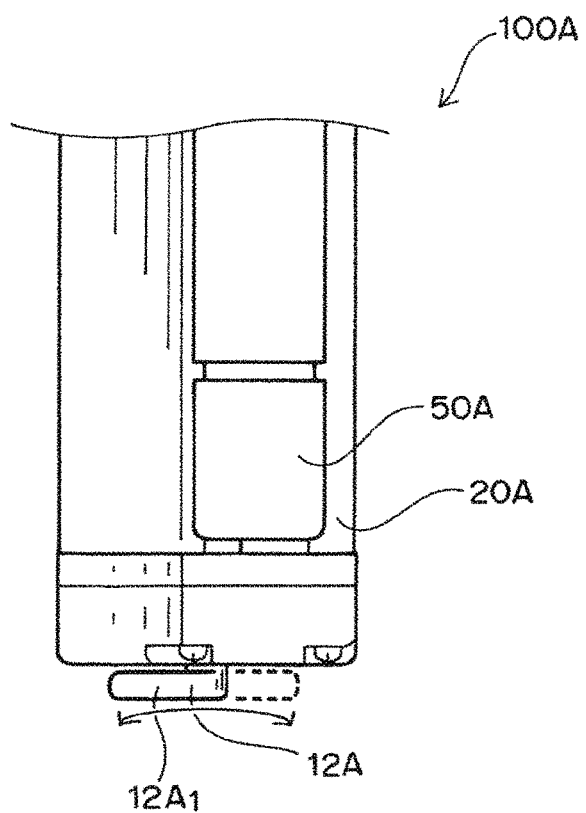
FIG. 7A is a top view schematically showing a portable screen device comprising a lever mechanism.
Figure 8:
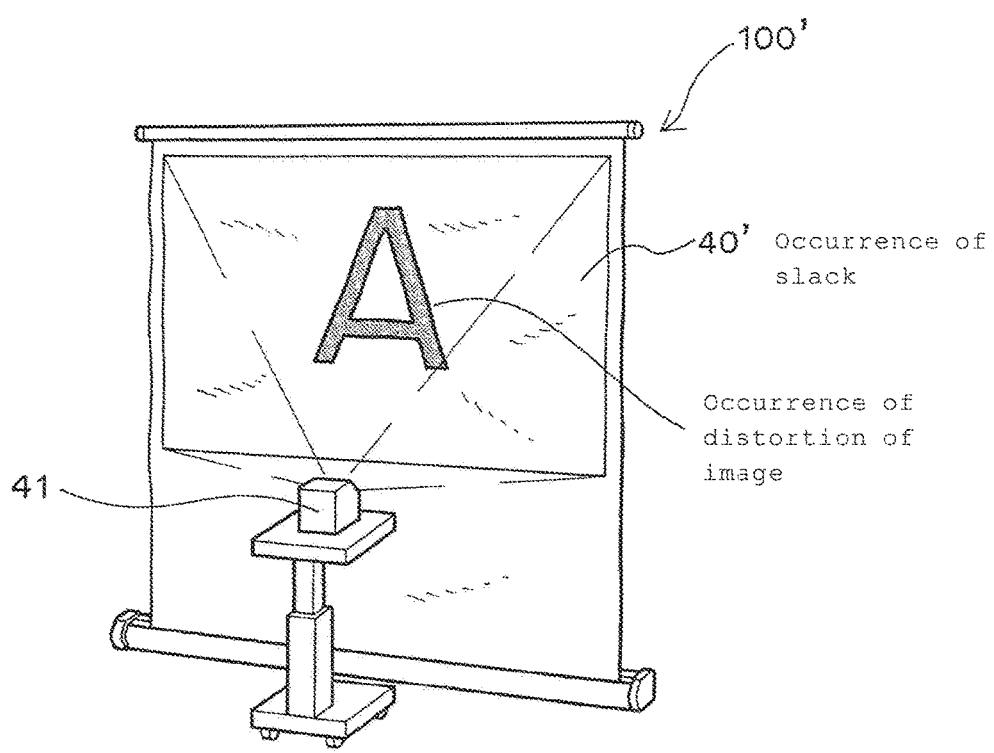
FIG. 8 is a perspective view schematically showing a conventional portable screen device.

For example, as shown in FIGS. 7A and 7B, a portable screen device 100 A according to an embodiment of the present invention may include a lever mechanism 12A instead of the above dial mechanism. The lever mechanism 12A may be composed of an extension part and a lever part 12A₁, the extension part being configured to be connectable to a rotatable roll in the casing 20A, the lever part 12A₁ being configured to be exposed on a side portion of the casing 20. Specifically, the extension part of the lever mechanism 12A is connected with the rotatable roll, and thereby the extension part serves as a rotatable shaft. The lever part 12A₁ of the lever mechanism 12A is configured to be capable of a pivot movement about the extension part of the lever mechanism 12A as a base point, since the extension part of the lever mechanism 12A serves as the rotatable shaft.

Hereinafter, a use embodiment regarding the lever mechanism 12A will be described.

The lever mechanism 12A is used in a state that the screen 40A is extended. Specifically, subsequent to the pull up of the screen 40 in a substantially vertical upward direction and then extension of the screen 40, the lever part 12A₁ of the lever mechanism 12A is subjected to a pivot movement in a predetermined direction along a side portion of the casing 20A about the extension part of the lever mechanism 12A as a rotatable base point. The term "predetermined direction" as used herein corresponds to a direction in which the screen 40A is pulled back onto the roll.

The pivot movement of the lever part 12A₁ causes the extension part of the lever mechanism 12A to be rotated, thereby to rotate the roll connected with the extension part in the direction for the pull back of the screen. The rotation of the roll in the direction for the pull back of the screen causes a force for the pull back of only a part of the screen 40A in the extension state to be provided. Thus, a provision of the pull back force makes it possible to apply a tension to the screen 40A in the extension state. Therefore, even if the screen 40A in the extension state has a slack therein, the application of the tension makes it possible to eliminate the slack arising in the screen 40A in the extension state. Accordingly, even if the image from the projector is projected on the screen 40A in the extension state, there is no problem of the distortion of the image projected on the screen 40A, and thereby an accurate projection of the image onto the screen is possible.

Furthermore, the technical idea of "partial pull back of the screen in the extension state by the dial mechanism for the application of the tension thereto" according to an embodiment of the present invention is mainly applied to a screen for a pull up in a substantially vertical upward direction. This is because the one of ends of the screen is fixed on a part for fixing the screen (i.e., the roll in the casing), and the other of ends of the screen is fixed on another part for fixing the screen (i.e., the support part for the screen), in order to adequately perform the partial pull back of the screen in the extension state for the application of the tension thereto. Namely, in order to adequately perform the partial pull back of the screen in the extension state for the application of the tension thereto, it is inevitably necessary to fix two portions of the screen in the extension state onto some part, the two portions specifically corresponding to the one of ends and the other of ends of the screen. Therefore, the technical idea of the present invention is mainly applied to the screen for the pull up in the substantially vertical upward direction.

However, if it is possible to fix the two portions of the screen in the extension state onto some part, the two portions specifically corresponding to the one of ends and the other of ends of the screen, the technical idea according to an embodiment of the present invention is not limited to be applied to only the screen for the pull up in the substantially vertical upward direction. For example, the technical idea according to an embodiment of the present invention may be also applied to a screen for a pull up in the substantially vertical downward direction or in a transverse direction (i.e., horizontal direction). As an example, in the case that the screen has the one of ends which is fixed on the roll, and the other of ends which is fixed on an end bar partially having a magnet, it is possible to fix two portions of the screen in the extension state thereonto, even upon a use of the screen for the pull up in the substantially vertical downward direction or in the transverse direction (i.e., horizontal direction), the two portions specifically corresponding to the one of ends and the other of ends of the screen.

In this case, if the above dial mechanism is used, it is possible to rotate the roll in the direction for the pull back of the screen. The rotation of the roll in the direction for the pull back of the screen can cause a force for a pull back of only a part of the screen in the extension state onto the roll to be provided. As a result, a provision of the pull back force makes it possible to adequately apply a tension to the screen in the extension state for the pull up in the substantially vertical downward direction or in the transverse direction (i.e., horizontal direction). Therefore, even if the screen in the extension state for the pull up in the substantially vertical downward direction or in the transverse direction (i.e., horizontal direction) has a slack therein, the application of the tension makes it possible to adequately eliminate the slack arising in the screen in the extension state.

It should be noted that the present invention as described above includes the following aspects:

The First Aspect:

A portable screen device, comprising:

a casing, a roll, a screen, and a screen support part, the casing having an opening, the roll being rotatably placed in the casing, the screen being configured to be wound on the roll during a storage of the screen and to be pulled out in an upward direction from the opening of the casing upon an use of the screen, the screen support part being for supporting the screen in an extension state by a pull out of the screen, wherein a dial mechanism is provided on a side portion of the casing, and wherein the dial mechanism is partially capable of pulling the screen in the extension state back in a different direction from a pull out direction of the screen.

The Second Aspect:

The portable screen device according to the first aspect, wherein the dial mechanism is capable of providing the screen in the extension state with a tension.

The Third Aspect:

The portable screen device according to the second aspect, wherein the dial mechanism is capable of maintaining the tension applied to the screen in the extension state.

The Fourth Aspect:

The portable screen device according to any one of the first to third aspects, wherein the dial mechanism at least comprises:

a shaft, the shaft being connected to an end portion of the roll;

a gear, the gear being connected to an end portion of a shaft;

a base plate, the base plate being positioned at a side portion of the casing and comprising a first through-hole through which the shaft passes;

a rotary part, the rotary part being located above the base plate and comprising knurls;

a first engagement part, the first engagement part being located on the base plate and being capable of engaging with the knurls of the rotary part; and a second engagement part, the second engagement part being located on the rotary part and being capable of engaging with the gear in order to let the gear pivot in the different direction from the pull out direction of the screen.

The Fifth Aspect:

The portable screen device according to the fourth aspect, wherein the first engagement part is sequentially capable of engaging with the knurls of the rotary part when the gear engaging with the second engagement part pivots in the different direction.

The Sixth Aspect:

The portable screen device according to the fourth or fifth aspect, wherein the base plate further comprises an elastic part, the elastic part serving to bring the second engagement part into an initial position before the second engagement part engages with the gear.

The Seventh Aspect:

The portable screen device according to any one of the fourth to sixth aspects, wherein the rotary part comprises a protrusion for compressing an elastic part.

The Eighth Aspect:

The portable screen device according to any one of the fourth to seventh aspects, wherein the base plate further comprises a projection, the projection projecting from the base plate to the rotary part comprising the second engagement part, and wherein the projection is capable of controlling a range for moving the second engagement part which engages with the gear pivoting in the different direction.

The Ninth Aspect:

The portable screen device according to any one of the fourth to eighth aspects, wherein the base plate further comprises a second through-hole and a part to be pressed on an inner main surface of the base plate, the second through-hole being different from the first through-hole through which the shaft passes, wherein the first engagement part comprises a bend portion passing through the second through-hole of the base plate, and wherein the part to be pressed and the bend portion of the first engagement part are in a connection with each other.

The Tenth Aspect:

The portable screen device according to the ninth aspect, further comprising a top bar fixed on an end of the screen, wherein the top bar is capable of pressing the part to be pressed upon the storage of the screen.

The Eleventh Aspect:

The portable screen device according to the ninth or tenth aspect, wherein the first engagement part pivots about a rotatable connection part as a base point upon a press of the part to be pressed, thereby releasing the engagement of the first engagement part with the knurls of the rotary part, the rotatable connection part being configured to interconnect the part to be pressed with the first engagement part.

INDUSTRIAL APPLICABILITY

The portable screen device according to an embodiment of the present invention can be used together with an ultrashort focus projector.

CROSS REFERENCE TO RELATED PATENT APPLICATION

The present application claims the right of priority of Japanese Patent Application No. 2016-002776 (filed on Jan. 8, 2016, the title of the invention: "PORTABLE SCREEN DEVICE"), the disclosure of which is incorporated herein by reference.

EXPLANATION OF REFERENCE NUMERALS

100 Portable screen device
100A Portable screen device
100' Conventional screen device
20 Casing
20A Casing
21 Side portion of casing
22 Opening of casing
23 Inclined portion of casing
30 Roll
31 End portion of roll
40 Screen
40A Screen
40' Conventional screen
41 Ultrashort focus projector
50 Top bar
50A Top bar
60 Handle
70 Part for supporting screen
10 Dial mechanism
11 Shaft
11a End portion of shaft 12A Lever mechanism
12A₁ Lever part
13 Gear
80 Base plate
80a Outer main surface of base plate
80b Inner main surface of base plate
80c upper surface of base plate
81 First through hole of base plate
82 Second through hole of base plate
83 First engagement part
83a Base portion of first engagement part
83b Protrusion portion of first engagement part
83c Bent portion of first engagement part
84 First projection portion of base plate
84a First end portion of first projection portion
84b Second end portion of first projection portion
85 Second projection portion of base plate
86 Third projection portion of base plate
87 Region for storing elastic part
87a First end portion of region for storing elastic part
87b Second end portion of region for storing elastic part
88 Elastic part
89 Part to be pressed
89a Base portion of part to be pressed
89b Upper surface portion of part to be pressed, corresponding to portion with which top bar contacts
89c Button portion of part to be pressed
89' Part to be pressed
89a' Base portion of part to be pressed
89b' Upper surface portion of part to be pressed, corresponding to portion with which top bar contacts
89c' Button portion of part to be pressed
90 Rotary part
90a Cover portion
91 Main surface of rotary part
92 Side surface positioned at outermost periphery of rotary part
92a Knurl provided on inner side of side surface positioned at outermost periphery of rotary part
93 Side surface positioned at inner periphery of rotary part
94 Side surface positioned at innermost periphery of rotary part
95 Through hole of rotary part
96a First space of rotary part
96b Second space of rotary part
97 Protrusion of rotary part
98 Second engagement part
98a Base portion of second engagement part
98b Extension portion of second engagement part
98c Protrusion portion of second engagement part
99 Support part for supporting second engagement part

The invention claimed is:

1. A portable screen device, comprising
a casing, a roll, a screen, and a screen support part, the casing having an opening, the roll being rotatably placed in the casing, the screen being configured to be wound on the roll during a storage of the screen and to be pulled out in an upward direction from the opening of the casing upon an use of the screen, the screen support part being for supporting the screen in an extension state by a pull out of the screen,
wherein a dial mechanism is provided on a side portion of the casing, and
wherein the dial mechanism is partially capable of pulling the screen in the extension state back in a different direction from a pull out direction of the screen.

2. The portable screen device according to claim 1, wherein the dial mechanism is capable of providing the screen in the extension state with a tension.

3. The portable screen device according to claim 1, wherein the dial mechanism is capable of maintaining the tension applied to the screen in the extension state.

4. The portable screen device according to claim 1, wherein the dial mechanism at least comprises:
a shaft, the shaft being connected to an end portion of the roll;
a gear, the gear being connected to an end portion of a shaft;
a base plate, the base plate being positioned at a side portion of the casing and comprising a first through-hole through which the shaft passes;
a rotary part, the rotary part being located above the base plate and comprising knurls;
a first engagement part, the first engagement part being located on the base plate and being capable of engaging with the knurls of the rotary part; and
a second engagement part, the second engagement part being located on the rotary part and being capable of engaging with the gear in order to let the gear pivot in the different direction from the pull out direction of the screen.

5. The portable screen device according to claim 4, wherein the first engagement part is sequentially capable of engaging with the knurls of the rotary part when the gear engaging with the second engagement part pivots in the different direction.

6. The portable screen device according to claim 4, wherein the base plate further comprises an elastic part, the elastic part serving to bring the second engagement part into an initial position before the second engagement part engages with the gear.

7. The portable screen device according to claim 4, wherein the rotary part comprises a protrusion for compressing an elastic part.

8. The portable screen device according to claim 4, wherein the base plate further comprises a projection, the projection being configured to project from the base plate to the rotary part comprising the second engagement part, and
wherein the projection is capable of controlling a range for moving the second engagement part which engages with the gear pivoting in the different direction.

9. The portable screen device according to claim 4, wherein the base plate further comprises a second through-hole and a part to be pressed on an inner main surface of the base plate, the second through-hole being different from the first through-hole through which the shaft passes,
wherein the first engagement part comprises a bend portion passing through the second through-hole of the base plate, and
wherein the part to be pressed and the bend portion of the first engagement part are in a connection with each other.

10. The portable screen device according to claim 9, further comprising a top bar fixed on an end of the screen, wherein the top bar is capable of pressing the part to be pressed upon the storage of the screen.

11. The portable screen device according to claim 9, wherein the first engagement part pivots about a rotatable connection part as a base point upon a press of the part to be pressed, thereby releasing the engagement of the first engagement part with the knurls of the rotary part, the rotatable connection part being configured to interconnect the part to be pressed with the first engagement part.

* * * * *